United States Patent [19]
Liu

[11] Patent Number: 5,539,827
[45] Date of Patent: Jul. 23, 1996

[54] DEVICE AND METHOD FOR DATA ENCRYPTION

[76] Inventor: Zunquan Liu, 13687 Paseo Cardiel #A, San Diego, Calif. 92129-2875

[21] Appl. No.: 416,969

[22] Filed: Apr. 5, 1995

Related U.S. Application Data

[63] Continuation of Ser. No. 61,205, May 13, 1993, Pat. No. 5,412,729.

[30] Foreign Application Priority Data

May 5, 1993 [EP] European Pat. Off. ............ 93107314

[51] Int. Cl.⁶ .................................................. H04L 9/06
[52] U.S. Cl. .................. 380/37; 380/28; 380/29
[58] Field of Search .................. 380/37, 28, 29

[56] References Cited

U.S. PATENT DOCUMENTS

| | | |
|---|---|---|
| 4,322,577 | 3/1982 | Brändström ............... 380/28 |
| 4,520,232 | 5/1985 | Wilson ...................... 380/28 |
| 5,003,597 | 3/1991 | Merkle . |
| 5,010,573 | 4/1991 | Musyck et al. . |
| 5,016,276 | 5/1991 | Matumoto et al. . |
| 5,113,444 | 5/1992 | Vobach . |
| 5,261,003 | 11/1993 | Matsui . |

FOREIGN PATENT DOCUMENTS

095923A3 12/1983 European Pat. Off. .
267647A2 5/1988 European Pat. Off. .
78/00100 12/1978 WIPO .

*Primary Examiner*—Gilberto Barrón, Jr.
*Attorney, Agent, or Firm*—Majestic, Parsons, Siebert & Hsue

[57] ABSTRACT

A cryptographic device and method provide a repertoire of mappings and associated inverse mappings between plaintext and ciphertext vectors. The plaintext is partitioned block-by-block, the block size being user-selectable, such as N characters. Each mapping maps between a pair of N-dimensional plaintext and ciphertext vectors. The mapping or associated inverse mapping is implemented by a matrix with N×N matrix elements, where each element is allowed to take on a range of L values. By permuting the matrix elements within their range, the repertoire has a size$\approx L^{N \times N}$. This size is immense even for moderate values of N and L. The users select one mapping or associated inverse mapping among the repertoire for respectively effecting the encryption or decryption. A secret key shared between the users includes information about the selected mapping or associated inverse mapping and may include values of N and L. To an outsider not privy to the secret key, the task of exhaustive research in the repertoire is computationally infeasible, especially if N and L are not known. In the preferred embodiment, a pseudo-random vector that varies block-by-block is added as another component to the ciphertext vector. A quick computational method is also described.

15 Claims, 7 Drawing Sheets

| N = 9, M = 0 - 9 | $2^9 = 512$ | |
|---|---|---|
| Binomial Coefficient C(N,M) | No. in each group | Configuration # (See Fig. 6B) |
| C(9,0) | 1 | not shown |
| C(9,1) | 9 | 1-9 |
| C(9,2) | 36 | 10-45 |
| C(9,3) | 84 | 46-129 |
| C(9,4) | 126 | 130-255 (not shown) |
| C(9,5) | 126 | 256-381 (not shown) |
| C(9,6) | 84 | 382-465 (not shown) |
| C(9,7) | 36 | 466-501 (not shown) |
| C(9,8) | 9 | 502-510 |
| C(9,9) | 1 | 511 |

DEVICE AND METHOD FOR DATA ENCRYPTION

This is a continuation of application Ser. No. 08/061,205, filed May 13, 1993, now U.S. Pat. No. 5,412,729.

FIELD OF INVENTION

This invention relates generally to cryptography, and more particularly to devices and methods for data encryption and decryption controlled by a secret key.

BACKGROUND OF THE INVENTION

In the modern "electronic" age, day-to-day commercial, official, and personal transactions are increasingly being conducted by means of data exchanged over public telecommunication channels. Sensitive data is often stored in insecure storage. The data exchanged over public telecommunication channels or stored in insecure storage is susceptible to unauthorized access by others, and confidentiality and privacy cannot be guaranteed.

Data encryption is one solution in preventing unauthorized access of data when in storage or transported over public telecommunication channels. Encryption is a form of computation that transforms a plaintext into an unintelligible ciphertext. Decryption is the inverse computation of encryption that recovers the plaintext from the unintelligible ciphertext.

In practice, data is first encrypted from plaintext into ciphertext by an encrypter before being transported over a public channel or committed to storage. Upon reception or retrieval of the data, a decrypter must decrypt the ciphertext back to plaintext to obtain the original data.

In a secret-key cryptographical scheme, a secret key is used to pass information about how the encrypter performed the encryption to an authorized decrypter so that the latter can construct an inverse to effectively perform the decryption. On the other hand, other unauthorized decrypters without the key will find it difficult if not impossible to decrypt the ciphertext.

Conventionally, in a secret-key cryptographic system, there is an established computational sequence of steps or algorithm for encryption and decryption. A secret-key cryptographic system is usually designed with the assumption that the algorithm is publicly known. The only thing that needs to be kept secret is the secret key which is shared only between the sender and an authorized receiver.

Typically the key provides a user-selected value which is taken together with the plaintext as inputs to the algorithm to effect encryption and decryption. Usually, the algorithm modifies the plaintext by adding the key value to it by some modulo arithmetic.

In practice, the secret key is privately communicated from the sender to the authorized receiver through a secure channel. In this way, the authorized receiver can efficiently decrypt the ciphertext using the publicly known algorithm in conjunction with the aid of the secret key. On the other hand, others, not privy to the secret key and short of any other cipher-attack scheme, will have to try out the possible keys in the key space one-by-one to see if one will yield an intelligible decryption. When the key space is extremely large, the encryption system is said to have high encryption intensity and the decryption of it is said to be computationally infeasible.

A computational task is computationally infeasible if it cannot practically be accomplished in a reasonable amount of time by means of reasonable resources. For example, one hundred years on the fastest available computer may be considered unreasonable. Similar, using a specially constructed computer that costs one hundred trillion dollars may be considered unreasonable.

One example of a secret-key system is a "one-time pad" or Vernam scheme, the plaintext is first coded into a binary bit string and is transformed to ciphertext by being added modulo 2 to a secret key. The secret key is a string of random bits as long as the plaintext, and is only used one time. This scheme can be proved to have perfect secrecy, but also has the undesirable requirement of one bit of secret key for each bit of plaintext. The need for the key bits to be as long as the message and that they cannot be reused make the scheme impractical in the context of modern age data transactions.

Attempts have been made by others to generate the large amount of random key bits by a pseudo-random generator. The pseudo-random generator is typically realized by a feedback shift register. The pseudo-random sequence generated is completely determined by the value initially in the shift register. The initial value can be used as a key, thereby allowing a small number of key bits to generate a long sequence of "random" bits. However, one-time pad cryptographic systems employing pseudo-random generators are susceptible to "known-plaintext" attacks, i.e., when a portion of the ciphertext and its corresponding plaintext are known.

Other schemes have been considered to provide a secret-key cryptographic system employing shorter key strings. Notable among these schemes is the "Data Encryption Standard," (DES), promulgated by the United States National Bureau of Standards, Federal Information Processing Standard (FIPS) Publication No. 46, January 1977. Since then, DES has been established as a standard public encryption scheme. According to DES, the encryption and decryption are performed block-by-block, each block being 64 bits long. The algorithm essentially consists of sixteen iterations of a series of predefined permutations, key addition, and predefined substitutions operations among sub-blocks within each 64-bit block. The 56-bit key is cycled through a shift register to generate sixteen values for the iterations.

While DES has been officially adopted as a standard in the last decade, it is generally felt that the time has come for it to be replaced by a new, improved standard. One reason is that the 56-bit key may be too short. It produces a key space of approximately $10^{17}$ possible keys. In view of modern high-speed and multi-processor computers, an exhaustive research of the key space (i.e., trying out every possible key to see if it will yield an intelligible decryption) of this size is becoming computationally feasible. Another disadvantage is that the underlying design principle, such as the choice of the various permutation and substitution transformations and the number of iterations required, is not clearly enunciated. There have been controversies about the possibility of a trapdoor being built into the system. Thus, it cannot be a truly public encryption system if a user cannot easily and accurately evaluate the actual security of the system. Also, the user has no systematic way to modify the algorithm or transformations to make the system more secure or to increase the encryption intensity. In any case, it appears that the encryption intensity cannot be increased without incurring an exponential increase in computing overheads. This is because DES, similar to other short-key schemes, relies on the principle of computationally intense algorithms to achieve encryption. The same short key is used many times but under different conditions to encrypt a much longer plaintext.

Another scheme is the RSA (Rivest, Shamir, and Adleman) Public-Key system. This relies on the principle of computationally complex algorithms to achieve encryption. The scheme has a user pick two very large prime numbers, preferable a few hundred digits each, to generate a pair of dissimilar encryption and decryption keys. Encryption is performed as exponentiation under a modulo arithmetic control by the encryption key. The encryption key can be made public for anyone to encrypt messages intended for the user, but is useless in deriving the decryption key. Thus, the encrypted messages can only be read by the user in possession of the decryption key. The undesirable feature is that the security of the system is based on the use of very large prime numbers that are not easy to obtain. Also, the system can be easily defeated if a quick way to factorize the product of two large prime number is discovered.

Thus, there is still a need for an improved data encryption system.

OBJECTS AND SUMMARY OF THE INVENTION

It is therefore a general object of the present invention to provide an improved method and device for data encryption and decryption which do not suffer from the above-mentioned disadvantages.

It is an object of the present invention to provide a method and device for data encryption and decryption in which the underlying principles are clearly understandable and can be made public without compromising its security. In this way, the present invention provides a truly public encryption system that can be established as a standard.

It is another object of the present invention to provide a method and device for data encryption and decryption which are extremely secure.

It is another object of the present invention to provide a method and device for data encryption and decryption in which their encryption intensity is user-selectable.

It is yet another object of the present invention to provide a method and device for data encryption and decryption which are simple to implement and have low computing overheads.

These and additional objects are accomplished by generating a user-selectable mapping among a vast repertoire of such mappings. The mapping operates on plaintext which has been partitioned block-by-block. The block size, N, is user-selectable, and each plaintext block is equivalent to an N-dimensional plaintext vector x. The mapping, specified by a set of user-selectable mapping parameters, maps the plaintext vector x to an N-dimensional ciphertext vector y. An associated inverse mapping also exists for inverse mapping the ciphertext vector y back to the plaintext vector x. The general principle and form of the mappings in the repertoire can be made public without compromising the security of the method and device. The mappings have the feature that its repertoire has a size that is an exponential function of the block size and the range of each mapping parameter.

According to one aspect of the invention, the block size and the range of each mapping parameter are also kept secret and only shared secretly between users by means of a secret key. Thus, others not privy to the secret key are frustrated in a usual cipher-attack method of exhaustively trying out every mapping in the repertoire. This is because they are confronted with a computationally infeasible task of exhaustive research among a repertoire of indeterminable size.

According to another aspect of the invention, the block size N, and the range of each mapping parameter need not be kept secret. Once sufficiently large values of them are selected to produce a repertoire having a predetermined size which is considered to be extremely large, the block size N and the range can be established as a standard and made public. Others in a cipher-attack are still confronted with a computationally infeasible task of exhaustive research among a repertoire of extreme large size.

In the preferred embodiment, the mapping is in the form:

$$y_t = A \, x_t + z_t,$$

and the associated inverse mapping is $$x_t = A^{-1}[y_t - z_t],$$

where $x_t$ and $y_t$ are respectively N-dimensional plaintext and ciphertext vectors corresponding to the tth block;

$A$ and $A^{-1}$ are respectively N×N mapping and associated inverse mapping matrices; and $z_t$ is an N-dimensional second component vector corresponding to the tth block.

A, and $z_t$ constitute the mapping parameters that are part of the secret key. Essentially, the N×N mapping matrix A defines the mapping space. If each matrix elements are allowed to vary over a range L, then the repertoire of mappings has a size given by permuting all matrix element, viz., $L^{N \times N}$. This is an exponential function and the repertoire size become enormous even for moderate values of N and L. For example, if N=3 and L=100, the repertoire has a mapping population of $10^{18}$.

In the preferred embodiment, a second component $z_t$ is added to make up each ciphertext vector in order to enhance the security of the scheme further. This is effective especially against a known-plaintext attack and the potential vulnerability of statistic attack on small block sizes. In one implementation, the second component is a pseudo-random vector which varies from block to block. In another implementation, the second component is a non-linear function or a mixture of non-linear function and a pseudo-random vector.

The present implementation does not have the same weakness as conventional methods that encrypt a plaintext string by adding a string of pseudo-random numbers to it. This is because the present mapping takes place in N-dimensional space, each pseudo-random number is in general not added directly to a single plaintext character as in the conventional case in order to convert it to a ciphertext character, but to a linear combination of plaintext characters. The problem of analyzing by others the pseudo-random number in this scheme is what is known mathematically as a non-deterministic polynomial (NP) problem.

One important aspect of the present invention is the provision of a mapping framework wherein its size in general and specific mapping property in particular are user-selectable by means of a secret key. Without the secret key, others are confronted with a computationally infeasible task of attempting an exhaustive research in the indeterminable repertoire of mappings.

Another important aspect of the present invention is that the computing overheads increase only as the square of the block size, whereas the encryption intensity increases exponentially. Thus, it is possible to achieve extremely high encryption intensity with little computing overheads. In contrast, the computing overheads of conventional encryption systems tend to increase exponentially as encryption intensity is increased. This is another manifestation of an NP problem.

Additional objects, features and advantages of the present invention will be understood from the following description of the preferred embodiments, which description should be taken in conjunction with the accompanying drawings.

BRIEF DESCRIPTION OF THE DRAWINGS

FIG. 6A lists the various permutations or possible selections of basis plaintext vector elements for a block of size N=9; and FIG. 6B illustrates the actual permutation configurations of selecting a number of elements from a block whose elements are arranged in a 3×3 image.

DETAILED DESCRIPTION OF THE PREFERRED EMBODIMENTS

Figure 1:
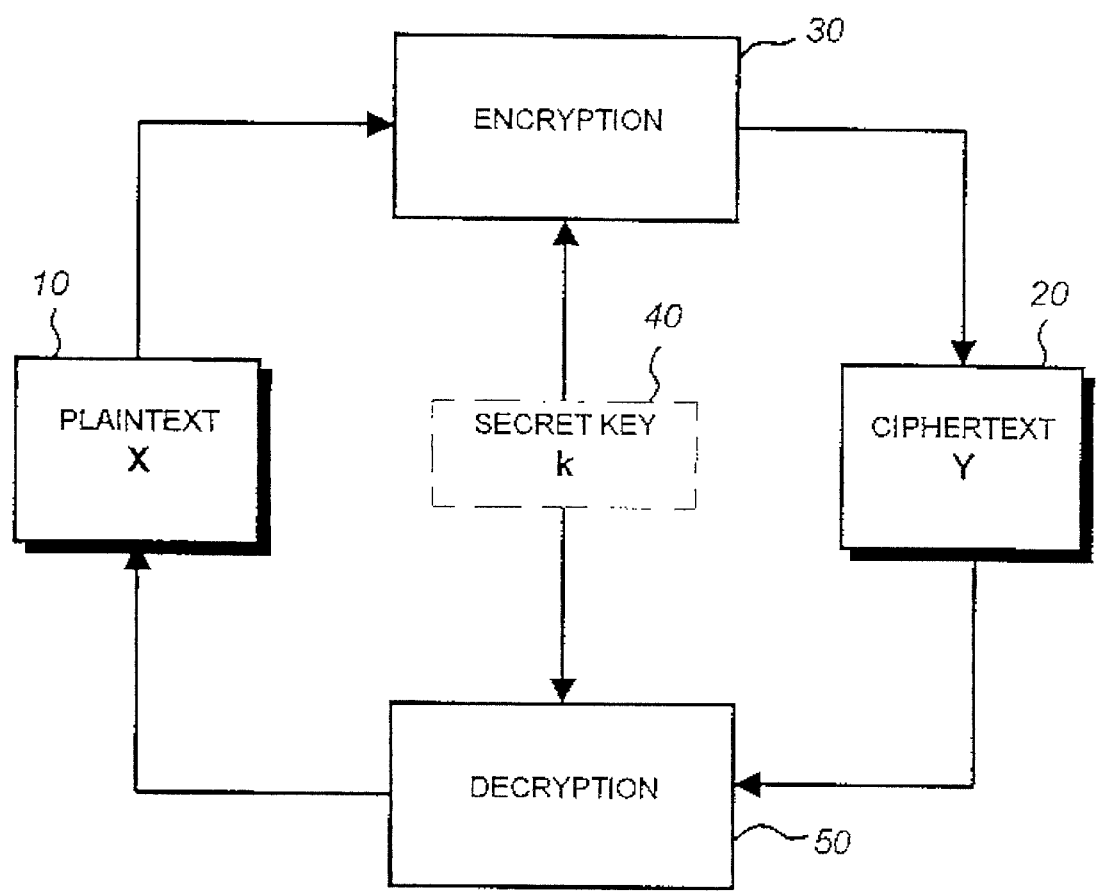
FIG. 1 illustrates schematically a general secret-key encryption system applicable to the present invention.

FIG. 1 illustrates schematically a general secret-key encryption system applicable to the present invention. Plaintext x 10 is being encrypted into ciphertext y 20 by means of an encryption device or process 30. A user-selectable secret key k 40 is used by an encrypter to control the encryption 30. The secret key k is shared privately with a decrypter who in turn uses it to control a decryption device or process 50 for decrypting the received ciphertext y back to plaintext x.

One important aspect of the present invention is the provision of a mapping framework for generating a repertoire of mappings. Its size in general and specific mapping property in particular are user-selectable by means of a secret key. Without the secret key, others are confronted with a computationally infeasible task of attempting an exhaustive research in an indeterminable repertoire of mappings.

The mapping maps or encrypts plaintext into ciphertext. Each mapping is specifyable by a set of mapping parameters which is essentially user-selectable as it is derivable from the secret key k.

The present invention has each plaintext stream partitioned block-by-block into plaintext vectors. The block size is also user-selectable via the secret key. If the block size is N, then the mapping maps an N-dimensional plaintext vector into a corresponding N-dimensional ciphertext vector.

The mappings have the feature that their repertoire has a size that depends on the block size as well as the range of each mapping parameter. A user can select a desired level of encryption intensity by adjusting these parameters. If each mapping parameter has a range given by L, then as will be shown later, the repertoire of mappings has a size given by $L^{N \times N}$. Thus, the key space grows exponentially with N. For example, if L=100, N=3, then $\{k\} \approx 10^{18}$ which is about ten times larger than that of DES. If N is expanded to =9, then $\{k\} \approx 10^{162}$. This means that an attacker, in an exhaustive research, will have to try out $10^{162}$ keys, even he or she has knowledge of N. In the preferred embodiment, N and L are also kept secret, the attacker is confronted with an indeterminable large key space.

Another important aspect of the present invention is that encryption intensity can practically be increased to very high level without exacting correspondingly high computing overheads. In contrast, the computing overheads of conventional encryption systems tend to increase exponentially as encryption intensity is increased. This is another manifestation of an NP problem.

Figure 2A:
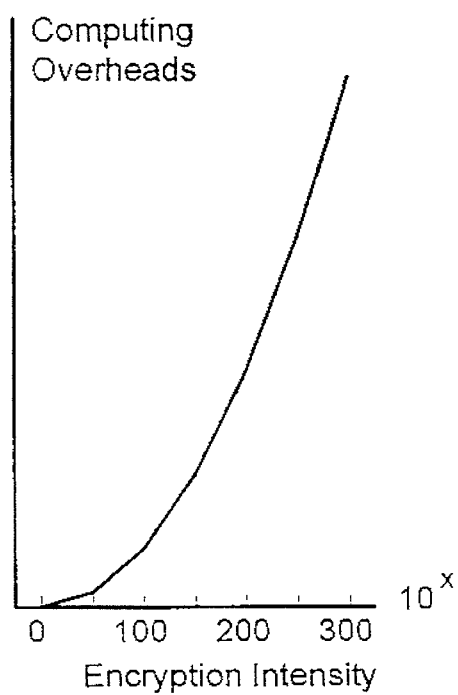
FIG. 2A illustrates the computing overheads versus encryption intensity for a conventional encryption system.
Figure 2B:
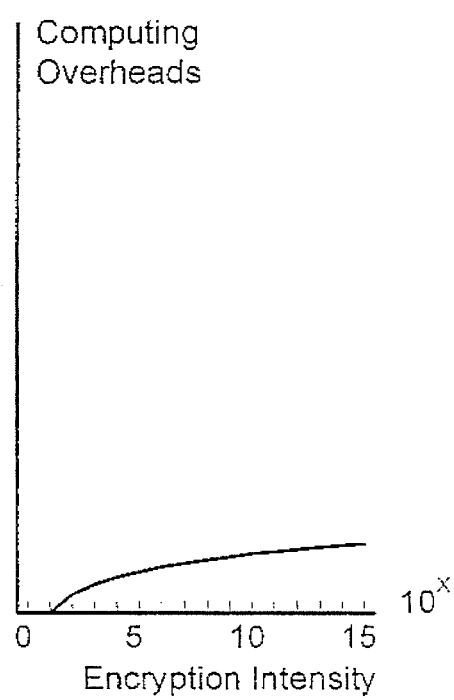
FIG. 2B illustrates the computing overheads versus encryption intensity for the present invention.

FIG. 2A illustrates the computing overheads versus encryption intensity for a conventional encryption system. FIG. 2B illustrates the computing overheads versus encryption intensity for the present invention. A comparision of the two figures illustrates that the computing overheads for the conventional system increases exponentially, whereas that of the present invention increases logarithmically. This is because the computing overheads of the present invention increase as the square of the block size, whereas the encryption intensity increases exponentially.

Figure 3:
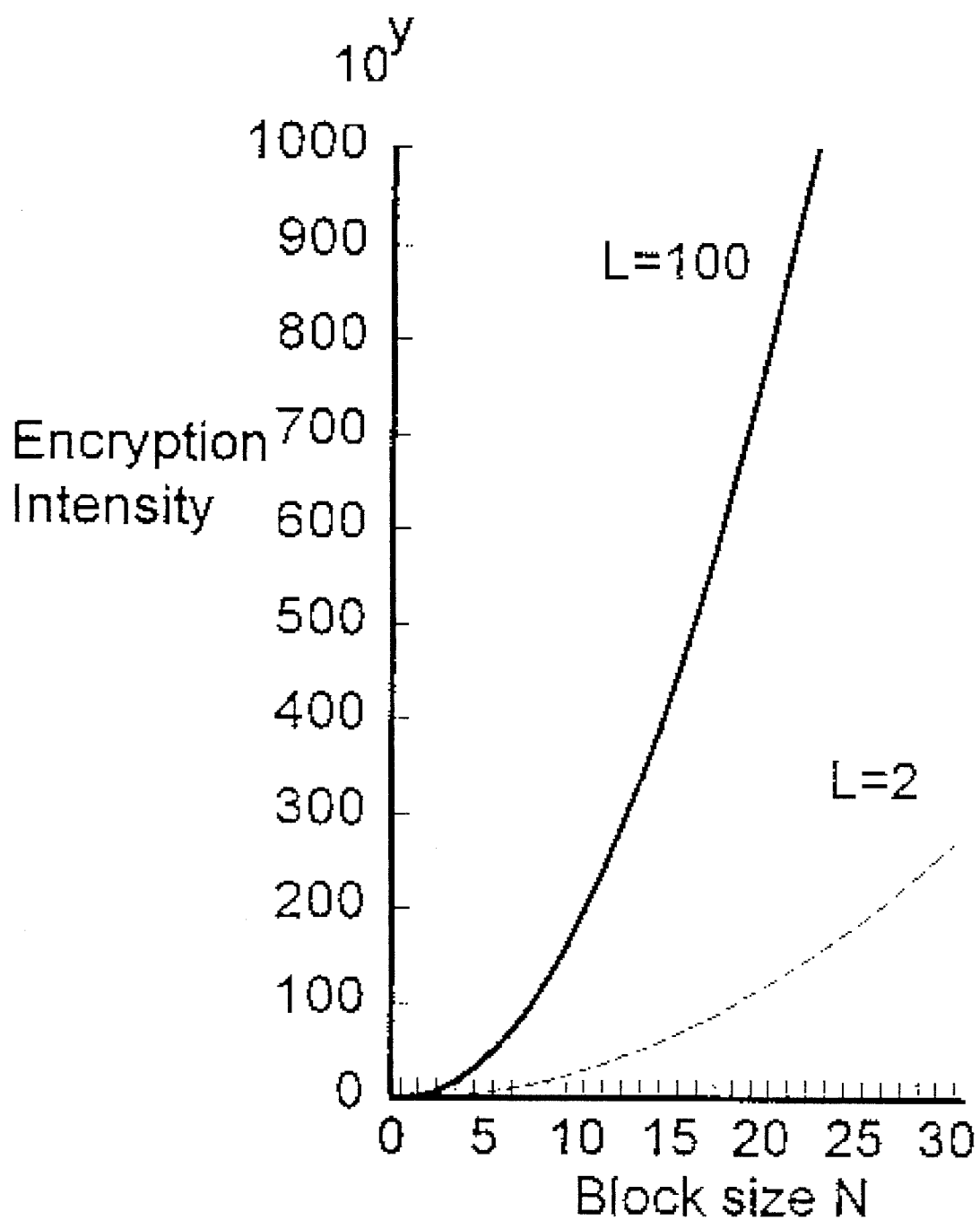
FIG. 3 illustrates the encryption intensity of the present invention increasing as an exponential function of the mapping parameters such as block size N and range of each mapping matrix element L.

FIG. 3 illustrates the encryption intensity of the present invention increasing as an exponential function of the mapping parameters such as block size N and range of each mapping matrix element L. The relation for two values of L are shown. L=2 corresponds to the case when each mapping matrix element is allowed to have one of two values, e.g., "0" and "1". L=100 corresponds to the case when each mapping matrix element is allowed to vary over a range with one hundred possible values, e.g., 0 to 99 or −49 to 50. It can be seen that it is possible for the present invention to achieve extremely high encryption intensity with little increases in computing overheads.

ENCRYPTION AND DECRYPTION METHOD

The preferred method of the present invention includes the following steps:

Step I. Select Block Size N

Each plaintext block corresponds to an N-dimenional plaintext vector. Each N-dimenional plaintext vector is encryptable to an N-dimenional ciphertext vector. Thus $$\text{Plaintext} \quad x = x_i = [x_1, x_2, \ldots, x_N] \quad (1)$$
$$\text{Ciphertext} \quad y = y_i = [y_1, y_2, \ldots, y_N]$$
$$i = 1, 2, \ldots, N$$

The original plaintext is usually in the form a character stream. This character representation can be converted to a numerical one by means of a predefined character code table. The $x_i$'s and $y_i$'s are coded in numerical representation.

In general, $x_1, x_2, \ldots, x_N$ do not necessarily correspond to the same order the elements in the plaintext character stream come in. An initial block permutation prior to mapping can be used to shuffle the initial ordering of the block elements. The initial block permutaiton can be specified as part of an encryption information to be passed from one user to another by means of the secret key. In this way, the other user can perform the inverse step to rearrange the plaintext back to its original order after it has been decrypted from the ciphertext.

Step II. Generate mapping for tth block $$y_t = A\, x_t + z_t \tag{2}$$

by the user specifying a set of mapping parameters: A, $z_t$, ... where t is a label for the tth block or vector, A is in general an invertible N×N mapping matrix $$A = a_{ij} = \begin{bmatrix} a_{11} & a_{12} & \ldots & a_{1N} \\ a_{21} & a_{22} & \ldots & a_{2N} \\ \cdot & \cdot & & \cdot \\ \cdot & \cdot & & \cdot \\ \cdot & \cdot & & \cdot \\ a_{N1} & a_{N2} & \ldots & a_{NN} \end{bmatrix} \tag{3}$$

$$i, j = 1, 2, \ldots, N$$

and $$z_t = (z_i)_t = [z_1, z_2, \ldots, z_N]_t \tag{4}$$

is a second vector component that can assume different forms depending on embodiments. As will be described in more detail later, in one embodiment it is a random vector that varies block-by-block. For example, $$(z_i)_t = b_i R(t, c_i) \tag{5}$$

where $R(t, c_i)$ is a pseudo-random function at t $b_i$ is a constant vector, e.g., $b = [b_1, b_2, \ldots, b_N]$ $c_i$ is an initial value of R.

In another embodiment, $(z_i)_t$ may also be a nonlinear function of $x_i$.

Step III. Share a secret key privately between users for passing encryption information from one user to another for decryption. For example, $$\begin{aligned} k \;\; &= \;\; [\text{Block size; Mapping parmeters,} \\ & \qquad \text{Random function specifications;} \\ & \qquad \text{initial block permutation}, \ldots ] \\ &= \;\; [N; A; z_t, \ldots ; \ldots ] \end{aligned} \tag{6}$$

In general the secret key k allows a set of encryption or decryption parameters to be derived for controlling the encryption and decryption respectively. The key space {k} includes the set of all possible keys that are generated by all possible values of each key parameters within its range. For example, if each mapping matrix element has a range with L possible values, such as $$\{L\} = \{0, 1, 2, \ldots, L-1\}$$

$$a_{ij} \in \{L\}$$

Then, given N, the set of possible keys residing in a key space is given by:

$$\{k\} \approx L^{N \times N} \tag{7}$$

Step IV. Generate the inverse mapping for tth block From Equation (2)

$$x_t = A^{-1}\, (y_t - z_t) \tag{8}$$

The inverse mapping parameters: $A^{-1}$, $z_t$, ... are derivable from the secret key in Equation (6). In particular, the inverse mapping matrix $A^{-1}$ is derived by inverting the mapping matrix A.

The mapping or inverse mapping is preferably carried out with integer quantities to avoid truncation problems. Thus, all the mapping parameters as well as the plaintext representation are given in integers and computations are exact. After the ciphertext has been decrypted back to plaintext, the plaintext in numerical representation can be decoded back to the original plaintext in character representation by means of the same character code table used in the decryption.

In the preferred embodiment, the second vector component $z_t$ is non-zero. It is added to make up each ciphertext vector in order to further enhance security, especially against a known-plaintext attack and the potential vulnerability of statistic attack on small block sizes.

In one preferred implementation, the second vector component is a pseudo-random vector that varies from block to block. For the tth block, by Equation (2), each ciphertext vector element is given by $$\begin{aligned} y_1 &= a_{11}x_1 + a_{12}x_2 + , \ldots , a_{1N}x_N + b_1 R(t, c_1) \\ y_2 &= a_{21}x_1 + a_{22}x_2 + , \ldots , a_{2N}x_N + b_2 R(t, c_2) \\ &\phantom{=} \cdot \\ &\phantom{=} \cdot \\ y_N &= a_{N1}x_1 + a_{N2}x_2 + , \ldots , a_{NN}x_N + b_N R(t, c_N) \end{aligned} \tag{9}$$

The secret key has parameters $$k = [N; a_{ij}; b_i; c_i; \ldots ] \tag{10}$$

The decryption is given by Equation (8), and plaintext can be recovered by $$x_t = A^{-1}\, (y_t - z_t)$$

In another preferred implementation, a speed computation is employed to quickly recover the plaintext from the ciphertext without having to invert the N×N mapping matrix A. In this instance, the second component $(z_i)_t$ is preferably either a non-linear function or a pseudo-random function. As before, the ciphertext vector elements are generally given by Equation (2)

$$y_i = a_{ij} x_j + z_i \;\; i, j = 1, 2, \ldots, N$$

The method calls for selecting a random subset of basis plaintext vector elements among each plaintext vector $$x_s \in \{x_i\}_{s=s1}, s_2, \ldots, s_M$$

such that $\{x_i\} = \{x_s\} \cup \{x_r\}\, r = r_1, r_2, \ldots, r_{N-M}$  $1 < M \leq N$ Define the ciphertext mapping as a function of $x_s$'s:

$$y_i = a_{is} x_s + z_i \tag{12}$$

with the property that (a) when i=s $$y_s = a_{ss} x_s + z_s \tag{13}$$

and $z_s$ is a random value as in Equation (5)

$$z_s = b_s R(t, c_s)$$

and (b) when i=r, $$y_r = a_{rs} x_s + z_r \tag{14}$$

where $$z_r = b_r G(x_r) \quad (15)$$

and $G(x_r)$ is a non-linear function, e.g., $$G(x_r) = x_r^3 \quad (16)$$

From Equation (13)

$$x_s = [y_s - b_s R(t, c_s)]/a_{ss}$$

From Equation (14) and Equation (15)

$$\begin{aligned} x_r &= G^{-1}[z_r/b_r] \\ &= G^{-1}[(y_r - a_{rs}x_s)/b_r] \\ &= G^{-1}[y_r - ((y_s - b_s R(t, c_s))a_{rs}/a_{ss})/b_r] \end{aligned}$$

For example
N=9
s=1, 5, 8
then
i=1, 2, ..., 9
r=1, 2, ..., 9
and the key is $$k = [N = 9; s_1 = 1, s_2 = 5, s_3 = 8; \quad (17)$$
$$a_{11}, a_{55}, a_{88};$$
$$a_{21}, a_{25}, a_{28}, a_{31}, a_{35}, a_{38}, \ldots, a_{98};$$
$$b_1, b_2, \ldots, b_9;$$
$$c_1, c_5, c_8; \ldots ]$$

To encrypt the tth block, from Equation (13)

$$y_1 = a_{11}x_1 + b_1 R(t, c_1)$$

$$y_5 = a_{55}x_5 + b_5 R(t, c_5)$$

$$y_8 = a_{88}x_8 + b_8 R(t, c_8)$$

from Equation (14)

$$y_2 = a_{21}x_1 + a_{25}x_5 + a_{28}x_8 + b_2 G(x_2)$$

$$y_3 = a_{31}x_1 + a_{35}x_5 + a_{38}x_8 + b_3 G(x_3)$$

$$y_4 = a_{41}x_1 + a_{45}x_5 + a_{48}x_8 + b_4 G(x_4)$$

$$y_6 = a_{61}x_1 + a_{65}x_5 + a_{68}x_8 + b_6 G(x_6)$$

$$y_7 = a_{71}x_1 + a_{75}x_5 + a_{78}x_8 + b_7 G(x_7)$$

$$y_9 = a_{91}x_1 + a_{95}x_5 + a_{98}x_8 + b_9 G(x_9)$$

To Decrypt the tth block, from Equation (13), the basis plaintext vector elements are easily obtained as $$x_1 = [y_1 - b_1 R(t, c_1)]/a_{11}$$

$$x_5 = [y_5 - b_5 R(t, c_5)]/a_{55}$$

$$x_8 = [y_8 - b_8 R(t, c_8)]/a_{88}$$

from Equation (14) and Equation (15), the non-basis plaintext vector elements are $$x_2 = G^{-1}[(y_2 - (a_{21}x_1 + a_{25}x_5 + a_{28}x_8))/b_2]$$

$$x_3 = G^{-1}[(y_3 - (a_{31}x_1 + a_{35}x_5 + a_{38}x_8))/b_3]$$

$$x_4 = G^{-1}[(y_4 - (a_{41}x_1 + a_{45}x_5 + a_{48}x_8))/b_4]$$

$$x_6 = G^{-1}[(y_6 - (a_{61}x_1 + a_{65}x_5 + a_{68}x_8))/b_6]$$

$$x_7 = G^{-1}[(y_7 - (a_{71}x_1 + a_{75}x_5 + a_{78}x_8))/b_7]$$

$$x_9 = G^{-1}[(y_9 - (a_{91}x_1 + a_{95}x_5 + a_{98}x_8))/b_9]$$

and from Equation (16) $G^{-1}[\ ]$=taking the cubic root of $[\ ]$ and in this way the plaintext $[x_1, x_2, \ldots, x_9]$ can be recovered quickly without having to invert an N×N matrix.

ENCRYPTION AND DECRYPTION DEVICE

Figure 4:
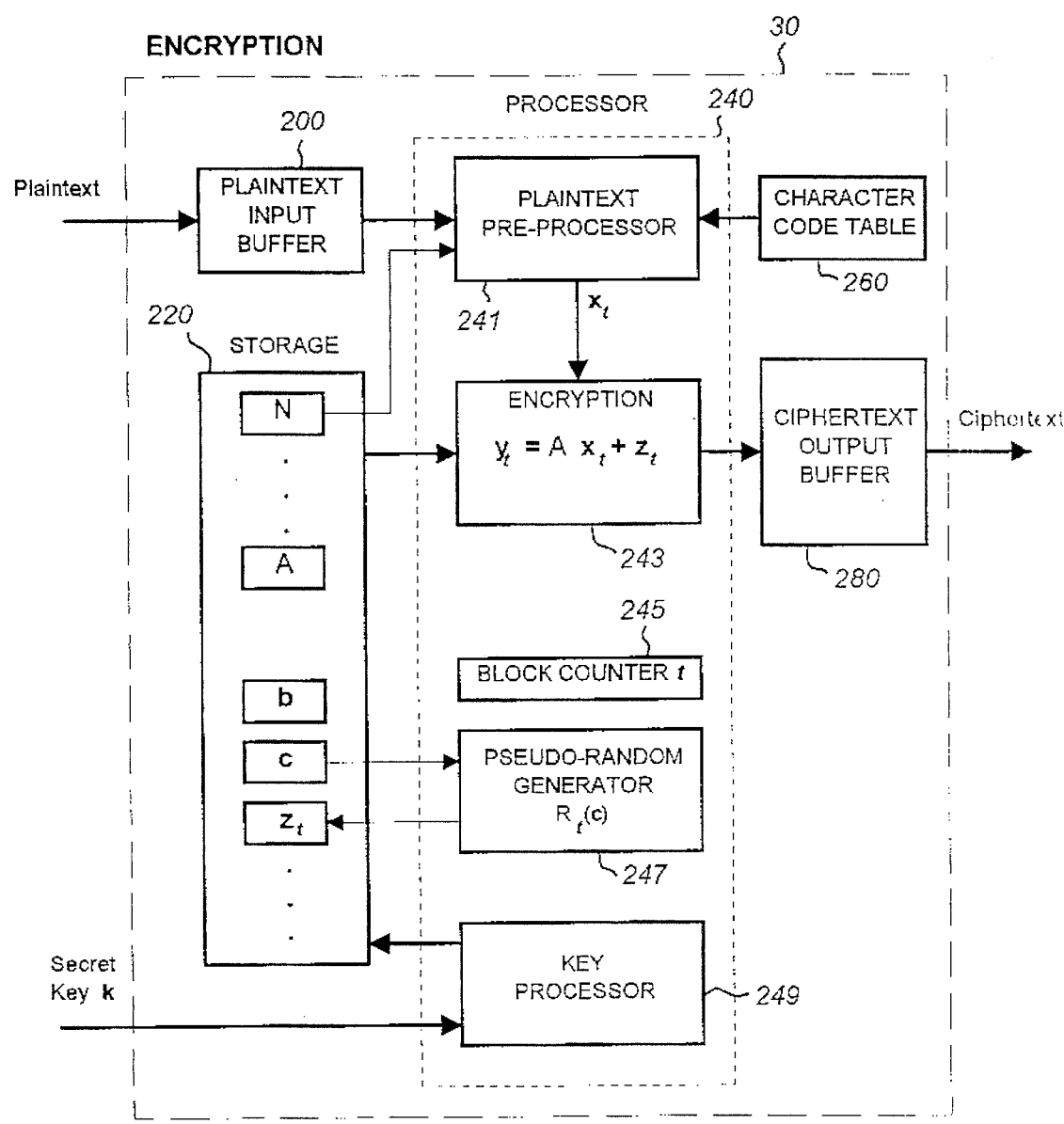
FIG. 4 is a functional block diagram of the encryption device according to a preferred embodiment of the present invention.

FIG. 4 is a functional block diagram of the encryption device according to a preferred embodiment of the present invention. The encryption device 30 essentially comprises a plaintext input buffer 200 for receiving input plaintext, a storage 220, a processor 240, a character code table 260, and a ciphertext output buffer 280.

The storage 220 is used to store, among other things, controlling parameters for controlling the encryption. Examples of such controlling parameters are N, A, $z_i$, ... As described above, N is the block size, A is the N×N mapping matrix, and $z_i$ is a vector that forms the second component of the ciphertext vector $Y_i$. There may be other parameters for controlling $z_i$, such as $z_i = z_i(b, c)$ where b is an N-dimensional constant vector and c is an initial value vector for input into a pseudo-random generator.

The processor 240 includes several functions which are illustrated as functional blocks, such as a plaintext pre-processor 241, an encryption processor 243, a block counter 245, a pseudo-random generator 247, and a key processor 249.

In operation, a secret key k is first processed by the key processor 249 to obtain the controlling parameters such as N, A, $z_i(b, c)$ which are then stored in storage 220. Preferably, the key processor also checks whether or not the input key is valid against a stored set of key validation rules. If the input key is found to be invalid, a message is communicated out of the device to notify the user as to what the problem is. In one implementation, the secret key k comprises a concatenation of the controlling parameters and the key processor 249 parses them out before they are stored in storage 220. In another implementation, the secret key k comprises a reduced input set compared to that required for the set of controlling parameters. The key processor 249 also serves as a key generator which expands the reduced input set to the full set of controlling parameters that are eventually stored in storage 220. For example, if a key space of $2^{256}$ is desired, the key is 256 bits' long and can be mapped by a predetermined key mapping onto the full set of controlling parameters. Once the controlling parameters are in place, they can be accessed by the processor 240.

Input plaintext in the form of a character stream entering the encryption device 30 is buffered by the plaintext input buffer 220 before being processed by the plaintext pre-processor 241.

The plaintext pre-processor 241 parses out the input plaintext character stream block-by-block of size N in accordance with the block size parameter from storage 220. In one implementation, the plaintext pre-processor also performs an initial block permutation in reponse to parameters in the storage 220. A character code table 260 is used to convert each character into a numerical value such that each block is equivalent to a plaintext vector x. The character code table may optionally be located outside the encryption device 30.

The block counter 247 keeps track of which block is being processed. Thus, the tth block produces the plaintext vector $x_t$.

The plaintext vector $x_t$ is then input into the encryption processor 243 where a corresponding ciphertext vector $y_t$ is computed. The ciphertext vector $y_t$ is obtained by operating an N×N matrix A on $x_t$ and adding a second component $z_t$ to it. The matrix A and the second component are obtainable from storage 220.

In the preferred embodiment, the second component is a randomizing component which varies block-by-block. A pseudo-random generator $R_t(c)$ 247 provides a series of pseudo-random vectors, one for each block. Each series is dependent on the initial value vector c. For the tth block, $z_t$ assumes the tth pseudo-random vector in the series.

In this way the ciphertext vectors are computed by the encryption processor 243 and are then output from the encryption device 30 via the ciphertext output buffer 280.

Figure 5:
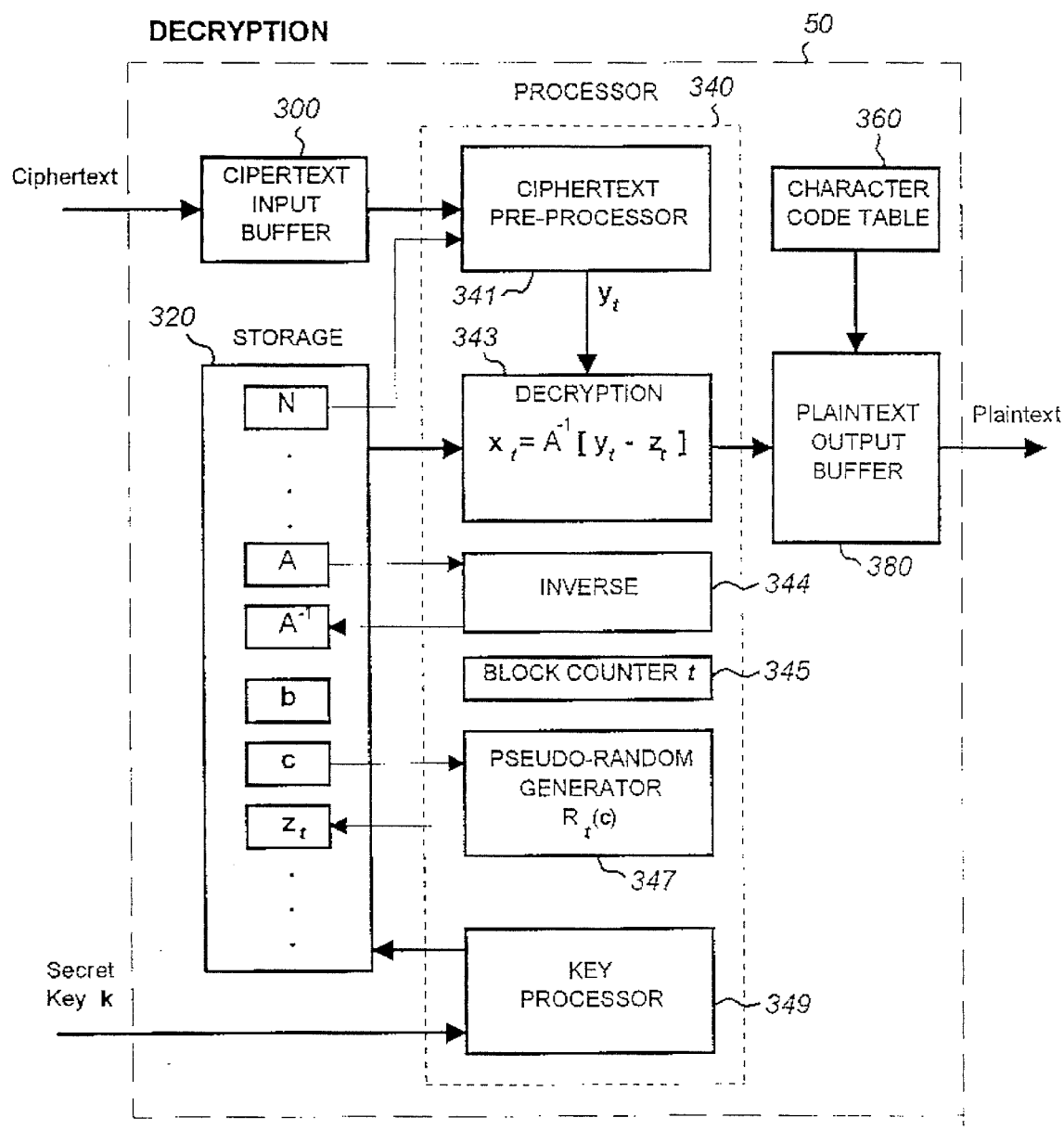
FIG. 5 is a functional block diagram of the decryption device according to a preferred embodiment of the present invention.
Figure 2A:
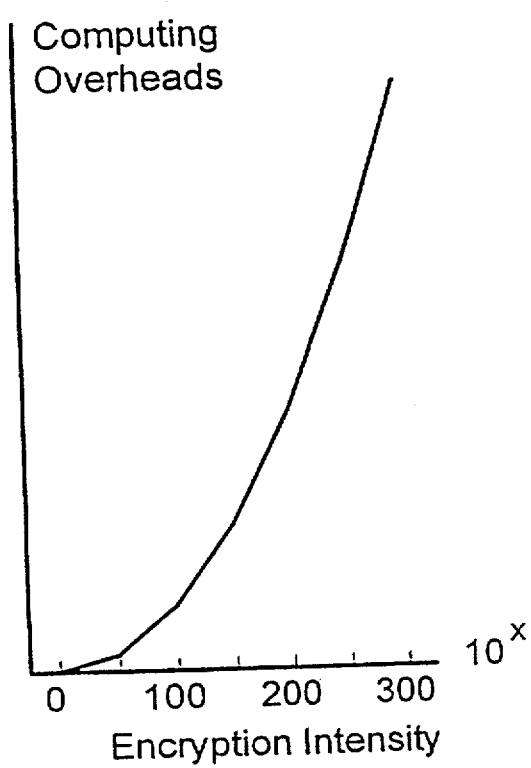
Figure 2B:
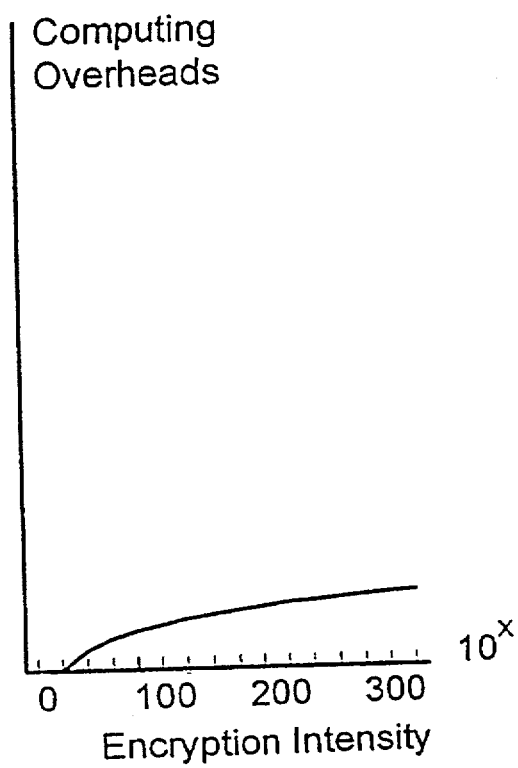

FIG. 5 is a functional block diagram of the decryption device according to a preferred embodiment of the present invention. The decryption device 50 is similar in structure to the encryption device 20, and essentially performs the inverse operations of the encryption device 20. It comprises a ciphertext input buffer 300 for receiving input ciphertext, a storage 320, a processor 340, a character code table 360, and a ciphertext output buffer 380.

The storage 320 is used to store, among other things, controlling parameters for controlling the decryption. Examples of such controlling parameters are N, A, $z_t(b,c)$, . . . , which are the same as that for encryption and are also derivable from the input secret key. However, in the decryption device, the mapping matrix A is not used directly in the computation, instead a derived inverse mapping matrix $A^{-1}$ is used.

The processor 340 includes several functions which are illustrated as functional blocks, such as a ciphertext pre-processor 341, a decryption processor 343, a block counter 345, a pseudo-random generator 347, and a key processor 349. These functional blocks are counterparts to that of the encryption device 30. In addition, the processor 340 also includes an inverse processor 344. The inverse processor 344 computes the inverse mapping matrix $A^{-1}$ given the mapping matrix A.

In operation, a secret key k is first processed by the key processor 349 similar to the encryption device 30. The controlling parameters such as N, A, $z_t(b,c)$, . . . are derived and then stored in storage 320. Once the controlling parameters are in place, they can be accessed by the processor 340.

Input ciphertext in the form of a stream of transformed numerical string entering the decryption device 50 is buffered by the ciphertext input buffer 320 before being processed by the ciphertext pre-processor 341.

The ciphertext pre-processor 341 parses out the input ciphertext stream block-by-block of size N in accordance with the block size parameter from storage 320. In this way, each block is equivalent to a ciphertext vector y.

The block counter 347 keeps track of which block is being processed. Thus, the tth block produces the ciphertext vector $y_t$.

The ciphertext vector $y_t$ is then input into the decryption processor 343 where a corresponding plaintext vector $x_t$ is computed. The plaintext vector $x_t$ is obtained by first subtracting the second component $z_t$ from $y_t$ before operating the N×N inverse mapping matrix $A^{-1}$ on it. The inverse mapping matrix $A^{-1}$ and the second component are obtainable from storage 320. The second component is identical to that in the encryption device 30.

In the preferred embodiment, the second component is a randomizing component which varies block-by-block. A pseudo-random generator $R_t(c)$ 347, identical to that in the encryption device 30, provides the same series of pseudo-random vectors that was used to randomize each block in the encryption device 30.

In the case when the original plaintext has undergone an initial block permutation, the decryption processor 343 also performs an inverse block permutation in response to parameters in the storage 320.

Once the plaintext vector $x_t$ is decrypted, it is decoded by means of a character code table 360 similar to that used in the encryption device. The character code table may be optionally located outside the decryption device 50. The coded numerical values in the plaintext vector are decoded back to their original characters.

In this way the original plaintext is recovered and is then output from the decryption device 50 via the ciphertext output buffer 380.

FIGS. 4 and 5 respectively illustrate the preferred hardware embodiments of an encryption device and a decryption device which are part of the cryptographic system shown in FIG. 1. The present invention also contemplates a computer under software control for implementing the various functions performed by the encryption device 30 and the decryption device 50. For example, the processors 240 and 340 can be assumed by the microprocessor of a general computer. The storages 220, 320 and buffers 200, 300 can be assumed by the various types of storage in the computer. A software can reside in one of the storages of the computer for controlling the encryption and decryption operations in accordance with the method described above.

RANDOM IMAGE SCHEME—systematic selection of mapping parameters

As described above, the invention requires the users to select a mapping from a repertoire. The selection is expressed by means of a secret key, and from the key a set of mapping parameters can be derived. The repertoire of mappings is essentially generated by permuting the elements of the N×N mapping matrix within their designated range. As pointed out above, the repertoire has a size that in practice becomes extremely large even for moderate values of N and L.

In the preferred embodiment a systematic way is employed to categorize the mappings into various groupings so that they can be easily distinguished and identified. In this way, the users can systematically make selections among the categorized mappings. This is especially expedient if the secret key need to be changed on a regular basis, or if a set of keys need be assigned to a group of people.

The scheme is to create categories of mappings by permuting the block or plaintext elements. This is similar to the selection of a subset of basis plaintext vector element among the plaintext vector described in the speed computation implementation above. The user randomly selects a subset of basis plaintext vector elements. In the simplest embodiment, the remaining un-selected plaintext vector elements are set to zero. In this way, each ciphertext vector element results from a linear combination of only the selected basis plaintext vector elements. In other words, the ciphertext vectors are essentially mapped to a subspace spanned by the selected basis plaintext vector elements.

In general, there are $2^N$ ways of permuting N elements when each element can take on one of two values. By the binomial theorem, the $2^N$ selections may be grouped as the sum of all possible permutations of M basis vector elements among N elements $$\sum_{0}^{M} C(N, M) = \sum \frac{N!}{M!(N-M)!} = 2^N$$

FIG. 6A lists the various permutations or possible selections of basis plaintext vector elements for a block of size N=9. The total number of permuted configurations is therefore $2^9=512$.

FIG. 6B illustrates the actual permutation configurations of selecting a number of elements from a block whose elements are arranged, in order from left to right and top to bottom, in a 3×3 image. The configurations are arranged in increasing order of M and bearing configuration numbers from #1 to #511. (Configuration #0, not shown, corresponds to the trivial case where no basis vector element is selected.) For example, referring to FIG. 6B, a user may select configuration #54, which specifies that the basis plaintext vector is $x=[x_1,0,x_3,0,x_5,0,0,0,0]$. If the users have an understanding that the secret-key is to be changed periodically, they can easily pick out a predetermined sequence of the configurations by the present scheme to provide a corresponding sequence of secret keys.

In yet another embodiment, a scheme of generating systematic mapping parameters can be accomplished by the initial block permutation mentioned earlier. In general, the plaintext vector elements $x_1, x_2, \ldots, x_N$ do not necessarily correspond to the same order the elements in the plaintext character stream come in. For example, $x_1$ may correspond to the 7th character and $x_2$ to the 1st character in a block of character stream. There are N factorial (N!) ways of stuffing N elements in N slots. The initial block permutation can be optionally selected by the user and its specification incorporated into the secret key. The different ordering can be generated by laying out the block elements onto various configurations (or images) according to one prescribed order and then reading them off according to another prescribed order. For example, for a block size N=9, one image is a 3×3 matrix. The block elements $[x_1,x_2,x_3,x_4,x_5,x_6,x_7,x_8,x_9]$ can be assigned to the matrix in the order from left to right and top to bottom. A different permutation $[x_7,x_4,x_1,x_8,x_5,x_2,x_3,x_6,x_9]$ is obtained by reading the elements off the matrix from bottom to top and left to right. In general, different permutations are obtained by variations in the image used and the manner in which the elements are laid out and reading off from the image.

While the embodiments of the various aspects of the present invention that have been described are the preferred implementations, those skilled in the art will understand that variation thereof may also be possible. Therefore, the invention is entitled to protection within the full scope of the appended claims.

It is claimed:

1. A cryptographical system for users to encrypt plaintext into ciphertext and decrypt the ciphertext back to the plaintext, comprising:

a secret key shared between the users;

a set of encryption parameters derivable from said secret key including a portion that are user-selectable through said secret key;

a mapping determined by said set of encryption parameters for mapping plaintext into ciphertext, said mapping being of the type with a repertoire having a size that is selectable by the users through said secret key;

a set of decryption parameters derivable from said secret key; and an inverse mapping determined by said set of decryption parameters for inverse mapping the ciphertext back to the plaintext; whereby the users can adjust the size of the repertoire of mappings through said secret key to achieve a desirable degree of encryption intensity.

2. A cryptographical system as in 1, further comprising:

means responsive to a block size parameter for partitioning the plaintext block-by-block into plaintext blocks or vectors each having a size according to said block size parameter; and wherein:

said mapping maps a plaintext vector into a corresponding ciphertext vector; and said portion of user-selectable encryption parameters includes said block size parameter.

3. A cryptographical system as in claim 1, further comprising:

a secret key generator for generating said secret key from an input with a predefined length.

4. A cryptographical system for users to encrypt plaintext into ciphertext and decrypt the ciphertext back to the plaintext, comprising:

a set of encryption parameters and a set of decryption parameters for respectively controlling the encryption and decryption;

a secret key shared between users;

means for deriving a user-selectable portion of said set of encryption parameters from said secret key;

means responsive to said set of encryption parameters for generating a mapping among a repertoire thereof for mapping plaintext into ciphertext, said mapping being of the type with a repertoire having a size that is selectable by the users through said secret key;

means for deriving a user-selectable portion of said set of decryption parameters from said secret key; and means responsive to said set of decryption parameters for generating an inverse mapping associated with said mapping for inverse mapping the ciphertext back to the plaintext.

5. A data encryption device for block-by-block encrypting of plaintext into ciphertext, comprising:

storage means for storing a set of encryption parameters including a portion that are selectable by a user, said portion of user-selectable encryption parameters including a block size parameter and mapping parameters for controlling mapping of plaintext into ciphertext, each of said mapping parameters having a range of possible values that are user-selectable;

plaintext processing means responsive to the block size parameter for partitioning an input plaintext block-by-block, thereby obtaining a plaintext vector corresponding to each block;

a mapping determined by said set of encryption parameters for mapping plaintext into ciphertext, said mapping being of the type with a repertoire having a size that is selectable by the user; whereby the users can adjust the size of the repertoire of mappings through said secret key to achieve a desirable degree of encryption intensity, and ciphertext output means for outputting the ciphertext from said data encryption device.

6. A data encryption device as in claim 5, further comprising:

key processing means for deriving said user-selectable portion of said encryption parameters from an input secret key.

7. A data encryption device as in claim 6, further comprising:

a secret key generator for generating said secret key from an input with a predefined length.

8. A data encryption device as in claim 5, further comprising:

a character coding means for converting plaintext that is in a character representation to a numerical representation.

9. A data decryption device for block-by-block decrypting of ciphertext from an associated encryption device into plaintext, comprising:

storage means for storing a set of decryption parameters including a portion that are selectable by a user, said portion of user-selectable decryption parameters including a block size parameter and inverse mapping parameters for controlling inverse mapping of ciphertext into plaintext, each of said inverse mapping parameters having a range of possible values that are user-selectable;

an inverse mapping determined by said set of decryption parameters for inverse mapping ciphertext into plaintext, said inverse mapping being the inverse of a mapping of the type with a repertoire having a size that is selectable by the user; whereby the users can adjust the size of the repertoire of mappings through said secret key to achieve a desirable degree of encryption intensity, and plaintext output means for outputting the plaintext from said data decryption device.

10. A data decryption device as in claim 9, further comprising:

key processing means for deriving said user-selectable portion of said decryption parameters from an input secret key.

11. A data encryption device as in claim 10, further comprising:

a secret key generator for generating said secret key from an input with a predefined length.

12. A data decryption device as in claim 9, further comprising:

character decoding means for converting plaintext that is in a coded numerical representation back to a character representation.

13. A cryptographical method for users to encrypt plaintext into ciphertext and decrypt ciphertext back to plaintext, comprising:

sharing a secret key between the users;

deriving a set of encryption parameters from said secret key including a portion that are user-selectable through said secret key;

generating a mapping determined by said set of encryption parameters for mapping plaintext into ciphertext, said mapping being of the type with a repertoire having a size that is selectable by the users through said secret key;

deriving a set of decryption parameters from said secret key; and generating an inverse mapping determined by said set of decryption parameters for inverse mapping the ciphertext back to the plaintext; whereby the users can adjust the size of the repertoire of mappings through said secret key to achieve a desirable degree of encryption intensity.

14. A cryptographical method as in 13, further comprising the step of:

partitioning the plaintext block-by-block in response to a block size parameter into plaintext blocks or vectors each having a size according to said block size parameter; and wherein:

said mapping maps a plaintext vector into a corresponding ciphertext vector; and said portion of user-selectable encryption parameters includes said block size parameter.

15. A cryptographical method as in claim 13, further comprising the step of:

generating said secret key from an input with a predefined length.

* * * * *

UNITED STATES PATENT AND TRADEMARK OFFICE
CERTIFICATE OF CORRECTION

PATENT NO. : 5,539,827
DATED : July 23, 1996
INVENTOR(S) : Zunquan Liu

It is certified that error appears in the above-indentified patent and that said Letters Patent is hereby corrected as shown below:

In the Drawings, replace Sheet 2 of 7 with new Drawing 2 of 7 attached

In Column 6, Line 26 replace:
"tion intensity for the present invention. A comparision of the" with --tion intensity for the present invention. A comparison of the--

In Column 8, Line 49 replace:
"$x_s \in \{x_{i)s=s1}, s_2, ..., s_M$" with $x_{\underline{s}} \in \{ x_{\underline{i}} \} \quad s = s_1, s_2, ..., s_M$ In Column 10, Line 65 replace:
"The block counter 247 keeps track of which block is being" with --The block counter 245 keeps track of which block is being--

UNITED STATES PATENT AND TRADEMARK OFFICE
CERTIFICATE OF CORRECTION

PATENT NO. : 5,539,827
DATED : July 23, 1996
INVENTOR(S) : Zunquan Liu

It is certified that error appears in the above-indentified patent and that said Letters Patent is hereby corrected as shown below:

In Column 11, Line 19-20 replace:
"the encryption device 20, and essentially performs the inverse operations of the encryption device 20. It comprises" with --the encryption device 30, and essentially performs the inverse operations of the encryption device 30. It comprises--

In Column 11, Line 23 replace:
"and a ciphertext output buffer 380" with

--and a plaintext output buffer--

In Column 13, Line 41-42 replace:
"top to bottom. A different permutation $[X_7, X_4, X_1, X_8, X_5, X_2, X_3, X_6, X_9]$ is obtained by reading the elements off the matrix" with --top to bottom. A different permutation $[X_7, X_4, X_1, X_8, X_5, X_2, X_9, X_6, X_3]$ is obtained by reading the elements off the matrix--

Signed and Sealed this

Tenth Day of June, 1997

*Attest:*

BRUCE LEHMAN

*Attesting Officer*   *Commissioner of Patents and Trademarks*